US006606389B1

(12) United States Patent
Selfridge et al.

(10) Patent No.: US 6,606,389 B1
(45) Date of Patent: Aug. 12, 2003

(54) PIEZOELECTRIC FILM SONIC EMITTER

(75) Inventors: Alan Robert Selfridge, deceased, late of Los Gatos, CA (US), Margaret Theresa Johnson-Selfridge, legal repesentative; Pierre Khuri-Yakub, Palo Alto, CA (US)

(73) Assignee: American Technology Corporation, San Diego, CA (US)

( * ) Notice: Subject to any disclaimer, the term of this patent is extended or adjusted under 35 U.S.C. 154(b) by 0 days.

(21) Appl. No.: 09/388,787

(22) Filed: Sep. 2, 1999

Related U.S. Application Data

(63) Continuation of application No. 08/819,614, filed on Mar. 17, 1997.

(51) Int. Cl.[7] ............................ H04B 3/00; H04R 3/00; H04R 25/00

(52) U.S. Cl. ......................... 381/111; 381/114; 381/77; 381/190

(58) Field of Search ................................ 381/190, 173, 381/111, 114, 191, 77; 310/324, 328, 800

(56) References Cited

U.S. PATENT DOCUMENTS

| | | | | | |
|---|---|---|---|---|---|
| 4,429,193 | A | | 1/1984 | Busch-Vishniac | 381/191 |
| 4,439,642 | A | | 3/1984 | Reynard | 381/191 |
| 4,471,258 | A | * | 9/1984 | Kumada | 310/345 |
| 4,515,997 | A | * | 5/1985 | Stringer et al. | 381/117 |
| 4,558,184 | A | | 12/1985 | Busch-Vishniac | 384/174 |
| 4,593,160 | A | | 6/1986 | Nakamura | 381/163 |
| 4,672,591 | A | | 6/1987 | Breimesser | 367/152 |
| 4,695,986 | A | | 9/1987 | Hossack et al. | 367/140 |
| 4,823,908 | A | * | 4/1989 | Tanaka et al. | 381/160 |
| 4,887,246 | A | | 12/1989 | Hossack et al. | 367/140 |
| 4,888,086 | A | | 12/1989 | Hossack et al. | 216/90 |
| 5,153,859 | A | | 10/1992 | Chatigny | 367/157 |
| 5,253,301 | A | * | 10/1993 | Sakamoto et al. | 381/89 |
| 5,287,331 | A | | 2/1994 | Schindel | 367/140 |
| 5,357,578 | A | * | 10/1994 | Taniishi | 381/158 |
| 5,684,884 | A | * | 11/1997 | Nakaya et al. | 381/190 |
| 5,889,870 | A | * | 3/1999 | Norris | 381/77 |

(List continued on next page.)

OTHER PUBLICATIONS

Aoki, K., et al., "Parametric Loudspeaker—Characteristics of Acoustic Field and Suitable Modulation of Carrier Ultrasound," *Electronics and Communications in Japan*, Part 3, vol. 74, No. 9, pp. 76–82 (1991).

Makarov, S.N., et al., "Parametic Acoustic Nondirectional Radiator," *Acustica*, vol. 77, pp. 240–242 (1992).

Westervelt, P.J., "Parametric Acoustic Array," *The Journal of the Acoustical Society of America*, vol. 35, No. 4, pp. 535–537 (1963).

Yoneyama, M., et al., "The Audio Spotlight: An Application of Nonlinear Interaction of Sound Waves to a New Type of Loudspeaker Design." *J. Acoust. Soc. Am.*, vol. 75, No. 5, pp. 1532–1536 (1983).

*Primary Examiner*—Minsun Oh Harvey
*Assistant Examiner*—Laura A. Grier
(74) *Attorney, Agent, or Firm*—Thorpe North & Western, L.L.P.

(57) ABSTRACT

A speaker device for emitting subsonic, sonic or ultrasonic compression waves comprising a a rigid emitter plate attached to the drum, and a plurality of apertures formed within the plate which are covered by a thin piezoelectric film disposed across the emitter plate. The thin film at the apertures distends into an arcuate emitter configuration capable of constricting and extending in response to variations in the applied electrical input at the piezoelectric film to thereby create a compression wave in a surrounding environment. Parametric ultrasonic frequency input is supplied to the piezoelectric film to propagate multiple ultrasonic frequencies having a difference component corresponding to the desired subsonic, sonic or ultrasonic frequency range.

4 Claims, 5 Drawing Sheets

U.S. PATENT DOCUMENTS

| | | | | | |
|---|---|---|---|---|---|
| 5,889,871 | A | * | 3/1999 | Downs, Jr. | 381/173 |
| 6,011,855 | A | * | 1/2000 | Selfreidge et al. | 381/111 |
| 6,044,160 | A | * | 3/2000 | Norris | 381/116 |
| 6,108,427 | A | * | 8/2000 | Norris et al. | 381/93 |
| 6,151,398 | A | * | 11/2000 | Norris | 381/192 |
| 6,321,428 | B1 | * | 11/2001 | Toda et al. | 381/190 |

* cited by examiner

PIEZOELECTRIC FILM SONIC EMITTER

This application is a continuation of Ser. No. 08/819,614 filed on Mar. 17, 1997.

BACKGROUND OF THE INVENTION

1. Field of the Invention

This invention pertains to compression wave generation. Specifically, the present invention relates to a device and method for directly generating sonic and ultrasonic compression waves, and indirectly generating a new sonic or subsonic compression wave by interaction of two ultrasonic compression waves having frequencies whose difference in value corresponds to the desired new sonic or subsonic compression wave frequencies.

2. State of the Art

Many attempts have been made to reproduce sound in its pure form. In a related patent application under Ser. No. 08/684,311, a detailed background of prior art in speaker technology using conventional speakers having radiating elements was reviewed and is hereby incorporated by reference. The primary disadvantage with use of such conventional speakers is distortion arising from the mass of the moving diaphragm or other radiating component. Related problems arise from distortion developed by mismatch of the radiator element across the spectrum of low, medium and high range frequencies—a problem partially solved by the use of combinations of woofers, midrange and tweeter speakers.

Attempts to reproduce sound without use of a moving diaphragm include technologies embodied in parametric speakers, acoustic heterodyning, beat frequency interference and other forms of modulation of multiple frequencies to generate a new frequency. In theory, sound is developed by the interaction in air (as a nonlinear medium) of two ultrasonic frequencies whose difference in value falls within the audio range. Ideally, resulting compression waves would be projected within the air as a nonlinear medium, and would be heard as pure sound. Despite the ideal theory, general production of sound for practical applications has alluded the industry for over 100 years. Specifically, a basic parametric or heterodyne speaker has not been developed which can be applied in general applications in a manner such as conventional speaker systems.

A brief history of development of the theoretical parametric speaker array is provided in "Parametric Loudspeaker—Characteristics of Acoustic Field and Suitable Modulation of Carrier Ultrasound", Aoki, Kamadura and Kumamoto, *Electronics and Communications in Japan. Part* 3, *Vol.* 74, *No.* 9 (March 1991). Although technical components and the theory of sound generation from a difference signal between two interfering ultrasonic frequencies is described, the practical realization of a commercial sound system was apparently unsuccessful. Note that this weakness in the prior art remains despite the assembly of a parametric speaker array consisting of as many as 1410 piezoelectric transducers yielding a speaker diameter of 42 cm. Virtually all prior research in the field of parametric sound has been based on the use of conventional ultrasonic transducers, typically of bimorf character.

U.S. Pat. No. 5,357,578 issued to Taniishi in October of 1994 introduced alternative solutions to the dilemma of developing a workable parametric speaker system. Hereagain, the proposed device comprises a transducer witch radiates the dual ultrasonic frequencies to generate the desired audio difference signal. However, this time the dual-frequency, ultrasonic signal is propagated from a gel medium on the face of the transducer. This medium 20 "serves as a virtual acoustic source that produces the difference tone 23 whose frequency corresponds to the difference between frequencies f1 and f2." Col 4, lines 54–60. In other words, this 1994 reference abandons direct generation of the difference audio signal in air from the face of the transducer, and depends upon the nonlinearity of a gel medium to produce sound. This abrupt shift from transducer/air interface to proposed use of a gel medium reinforces the perception of apparent inoperativeness of prior art disclosures, at least for practical speaker applications.

OBJECTS AND SUMMARY OF THE INVENTION

It is an object of the present invention to provide a method and apparatus for indirectly emitting new sonic and subsonic waves at acceptable volume levels from a region of air without use of conventional piezoelectric bimorph transducers as the ultrasonic frequency source.

It is another object to indirectly generate at least one new sonic or subsonic wave having commercially acceptable volume levels by using a thin film emitter which provides interference between at least two ultrasonic signals having different frequencies equal to the at least one new sonic or subsonic wave.

It is still another object to provide a thin film speaker diaphragm capable of developing a uniform wave front across a broad ultrasonic emitter surface.

A still further object of this invention is to provide an improved speaker diaphragm capable of generating compression waves in response to electrical stimulation, yet which does not require a rigid diaphragm structure.

These objects are realized in a speaker which includes a thin, piezoelectric membrane disposed over a common emitter face having a plurality of apertures. The apertures are aligned so as to emit compression waves from the membrane along parallel axes, thereby developing a uniform wave front. The membrane is drawn into an arcuate configuration and maintained in tension across the apertures by a near vacuum which is created within a drum cavity behind the emitter membrane. The piezoelectric membrane responds to applied voltages to linearly distend or constrict, thereby modifying the curvature of the membrane over the aperture to yield a compression wave much like a conventional speaker diaphragm. This configuration not only enables compression wave generation, but also eliminates formation of adverse back-waves because of the applied vacuum.

In another aspect of the invention, the emitter includes a drum comprised of a single emitter membrane disposed over a support plate having a plurality of apertures at a common emitter face. The membrane is arcuately distended within the apertures for manipulation of the membrane in response to applied voltage.

In still another aspect of the invention a microphone device is developed by disposing a piezoelectric film as a detector membrane across apertures within a sensor face. This membrane, when in tension based on pressure applied from the drum cavity, is able to sense sound as compression waves. This is accomplished by the reverse process of the speaker embodiment referenced above, as electrical signals are generated within the piezoelectric material in response to impact of compression waves on the piezoelectric film.

Other objects, features, advantages and alternative aspects of the present invention will become apparent to those skilled in the art from a consideration of the following detailed description, taken in combination with the accompanying drawings.

DETAILED DESCRIPTION OF THE INVENTION

The traditional use of piezoelectric transducers in a parametric array as a speaker member embodies numerous limitations which have apparently discouraged many practical applications of transducers within the audio and ultrasonic sound generation industries. Such limitations include lack of uniformity of frequency generation across a large array of individual transducers. Often, pockets of distortion occur because of small variations in transducer resonant frequencies, as well as variable response to differing frequencies within a broad frequency spectrum. Many of these limitations arise because a typical speaker array is formed from many individual transducers respectively wired to a common signal source. Each transducer is somewhat unique and operates autonomously with respect to the other transducers in parallel configuration.

The present invention develops congruity and uniformity across the array by providing a single film of piezoelectric material which is predictable in response to applied signal across the full emitter face. This results, in large measure, because the emitter is actually a single film of the same composition supported across a plurality of apertures of common dimension. Furthermore, the full emitter face is physically integrated because the material is simply disposed across the emitter plate or disk and is activated by a single set of electrical contacts. Therefore, the array of individual emitting locations, represented by the respective apertures in the emitter plate, are actually operating as a single film, composed o cone material, which is activated by the same electrical input. Arcuate distention is uniform at each aperture because the same maternal is being biased in tension across the same dimension by a common pressure (positive or negative) from within the drum cavity. Harmonic and phase distortions are therefore minimazes, facilitating a uniform wave front across the operable bandwidth.

Figure 1:
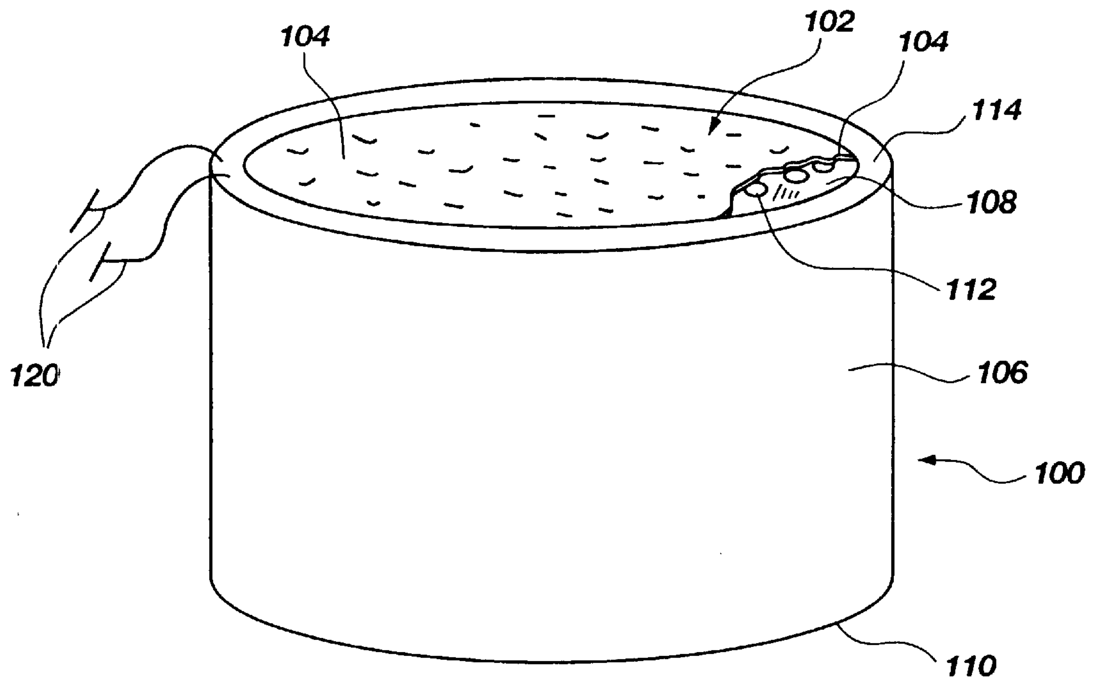
FIG. 1 is an orthogonal view of an emitter drum transducer made in accordance with the principles of the present invention.
Figure 2:
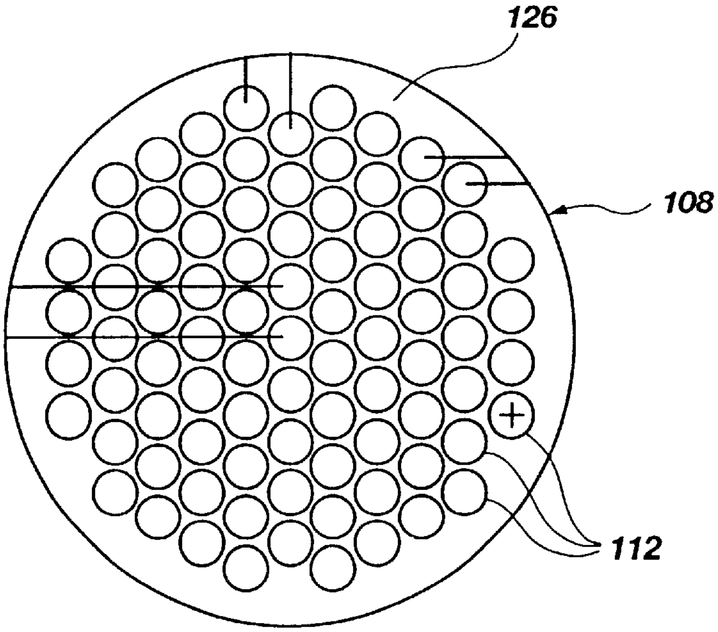
FIG. 2 is a top view showing a plurality of apertures in an emitter face of the emitter drum transducer made in accordance with the principles of the present invention.
Figure 3:
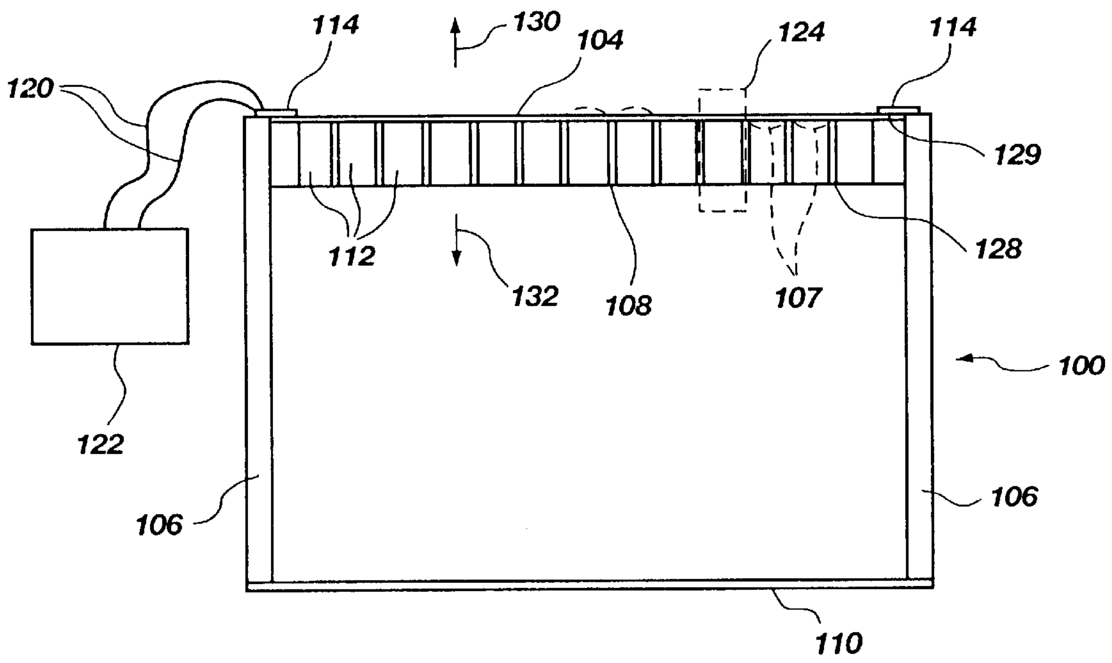
FIG. 3 is a cut-away profile view of the emitter drum transducer and the emitter face, showing the membrane which is disposed over the apertures in the emitter face.

FIGS. 1, 2 and 3 depict a preferred embodiment of the present invention shown in orthogonal, partial cutaway view. The emitter drum transducer 100 is a hollow, generally cylindrical object. The sidewall 106 of the emitter drum transducer 100 is a metal or metal alloy. The emitter face 102 generates the compression waves from the top surface of the emitter drum transducer 100 and is comprised of at least two components—the emitter film 104 and the emitter plate or disk 108.

The outer surface of the emitter face 102 is formed by the thin piezoelectric film 104. This film 104 is supported by the rigid emitter plate 108 which includes a plurality of apertures 112 for enabling distention of the film into small arcuate emitter elements. As mentioned above, these emitter elements are uniform in all respects—size, curvature and composition. This commonality results in a common output across the face of the emitter film as if it were a single emitter element.

The piezoelectric film 104 is stimulated by electrical signals applied through appropriate contacts 120 and is thereby caused to vibrate at desired frequencies to generate compression waves. This is facilitated by a conductive ring 114 which restrains the thin film in tension across the emitter plate or disk 108 in a manner similar to a drum head. The conductive ring is therefore positioned above the piezoelectric film 104 and disposed about the perimeter of the emitter face 102, and operates as both a clamp and electrical signal source for the piezoelectric material. Typically, this conductive ring 114 is made of brass, however, other electrically conductive materials could be utilized.

The emitter drum transducer 100 is generally hollow inside, and is closed at a bottom surface by a back cover 110. This structure is sealed to enable a generally airtight enclosure or drum cavity. A near-vacuum (hereinafter referred to as a vacuum) or a pressurized condition can exist within the emitter drum transducer 100 for reasons to be explained later. The near-vacuum will be defined as a pressure which is small enough to require measurement in millitorrs.

To better understand the structure of the emitter drum transducer 100, FIG. 2 provides a top view of an outward facing face 126 of an isolated emitter disk 108 which is normally disposed underneath the piezoelectric film 104 (see FIG. 1). In the preferred embodiment, the disk 108 is metallic and perforated by a plurality of apertures 112 of generally uniform dimensions. The apertures 112 extend completely through the thickness of the disk 108 from an inward facing side 128 (see FIG. 3) to the outward facing side 126. To provide predictability and the greatest efficiency in performance, the apertures 112 are formed in the shape of cylinders.

The predictability in vibrations of the piezoelectric film 104 when suspended in arcuate tension over cylindrical apertures 112 is a consequence of a significant amount of knowledge which has been developed regarding the symmetrical bending of circular plates. This should not be construed to mean that other aperture 112 shapes can not be used. However, other aperture shapes are less likely to achieve predictable, efficient and advantageous vibration patterns in the piezoelectric film 104. Therefore, the preferred embodiment has adopted cylindrical apertures 112 as a predictable configuration.

The pattern of apertures 112 shown on the disk 108 in FIG. 2 is chosen in this case because it enables the greatest number of apertures 112 to be located within a given area. The pattern is typically described as a "honeycomb" pattern. The honeycomb pattern is selected because it is desirable to have a large number of apertures 112 with parallel axes because of the characteristics of acoustical heterodyning.

Specifically in the case of generating ultrasonic frequencies, it is desirable to cause heterodyning interference between a base frequency and a frequency which carries intelligence Lo thereby generate a new sonic or subsonic frequency which is comprised of the intelligence. Consequently, a greater number of base and intelligence carrying signals which are caused to interfere in close proximity to each other will generally have the effect of generating a new sonic or subsonic frequency of greater volume as compared to a single pair of base and intelligence carrying frequencies. In other words the present invention provides the significant advantage of developing large numbers of emitter elements for carrying the interfering frequencies, yet without losing the benefit of common composition, integration and vibrational response. Obviously, this is an important factor in generating a volume which is loud enough to be commercially viable. The parallel orientation of axes of frequency emission further enhance development of acceptable volume levels.

FIG. 3 provides a helpful profile and cut-away perspective of the preferred embodiment of the present invention, including more detail regarding electrical connections to the emitter drum transducer 100. The sidewall 106 of the emitter drum transducer 100 provides an enclosure for the disk 108, with its plurality of apertures 112 extending therethrough. The piezoelectric film 104 is shown as being in contact with the disk 108. Experimentation was used to determine that it is preferable not to glue the piezoelectric film 104 to the entire exposed surface of the disk 108 with which the piezoelectric film 104 is in contact. The varying size of flue fillets between the piezoelectric film 104 and the apertures 112 causes the otherwise uniform apertures 112 to generate resonant frequencies which were not uniform. Therefore, the referred embodiment teaches only gluing an outer edge of the piezoelectric film 104 to the disk 108.

The back cover 110 is provided to permit a vacuum within the emitter drum transducer 100. This vacuum causes the piezoelectric film 104 to be pulled against the disk 108 in a generally uniformly manner across the apertures 112. Uniformity of tension of the piezoelectric film 104 suspended over the apertures 112 is important to ensure uniformity of the resonant frequencies produced by the piezoelectric film 104 at each emitter element. In effect, each combination of piezoelectric film 104 and aperture 112 forms a miniature emitter element or cell 124. By controlling the tension of the piezoelectric film 104 across the disk 108, the cells 124 advantageously respond generally uniform.

An additional benefit of a vacuum is the elimination of any possibility of undesirable "back-wave" distortion. Elimination of the back-wave in the present invention arises from the presence of the vacuum in the sealed drum cavity. By definition, a compression wave requires that there be a compressible medium through which it can travel. If the piezoelectric film 104 can be caused to generate ultrasonic compression waves "outward" in the direction indicated by arrow 130 from the emitter drum transducer 100, it is only logical that ultrasonic compression waves are also being generated from the piezoelectric film 104 which will travel in an opposite direction, backwards into the emitter drum transducer 100 in the direction indicated by arrow 132.

In the absence of the vacuum condition, these backward traveling or back-wave distortion waves could interfere with the ability of the piezoelectric film 104 to generate desired frequencies. This interference could occur when the back-waves reflect off surfaces within the emitter drum transducer 100 until they again travel up through an aperture 112 and reflect off of the piezoelectric film 104, thus altering its vibrations. Therefore, by eliminating the medium for travel of compression waves (air) within the emitter drum transducer 100, reflective vibrations of the piezoelectric film 104 are eliminated.

FIG. 3 also shows that there are electrical leads 120 which are electrically coupled to the piezoelectric film 104 and which carry an electrical representation of the frequencies to be transmitted from each cell 124 of the emitter drum transducer 100. These electrical leads 120 are thus necessarily electrically coupled to some signal source 122 as shown.

Figure 4A:
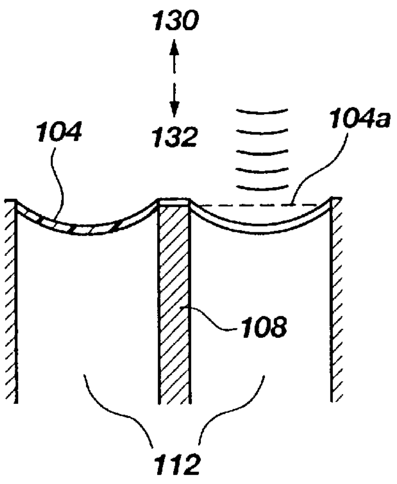
FIG. 4 is a close-up profile view of the membrane which is vibrating while stretched over a plurality of the apertures in the emitter face.
Figure 4B:
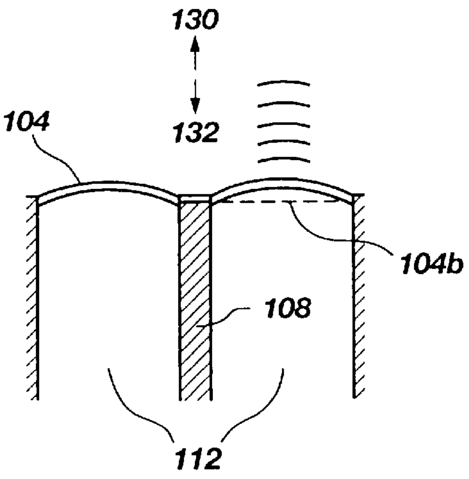

FIG. 4A is a close-up profile view of two of the cells 124 (comprised of the piezoelectric film 104 over two apertures 112) of the preferred embodiment. The piezoelectric film 104 is shown distended inward toward the interior of the emitter drum transducer 100 in an exaggerated vibration for illustration purposes only. It should be apparent from a comparison with FIG. 4B that the distention inward of the piezoelectric film 104 will be followed by a distention outward and away from the interior of the emitter drum transducer 100 with relaxation of the applied signal. The amount of distention of the piezoelectric film 104 is again shown exaggerated for illustration purposes only. The actual amount of distention will be discussed later.

Figure 5:
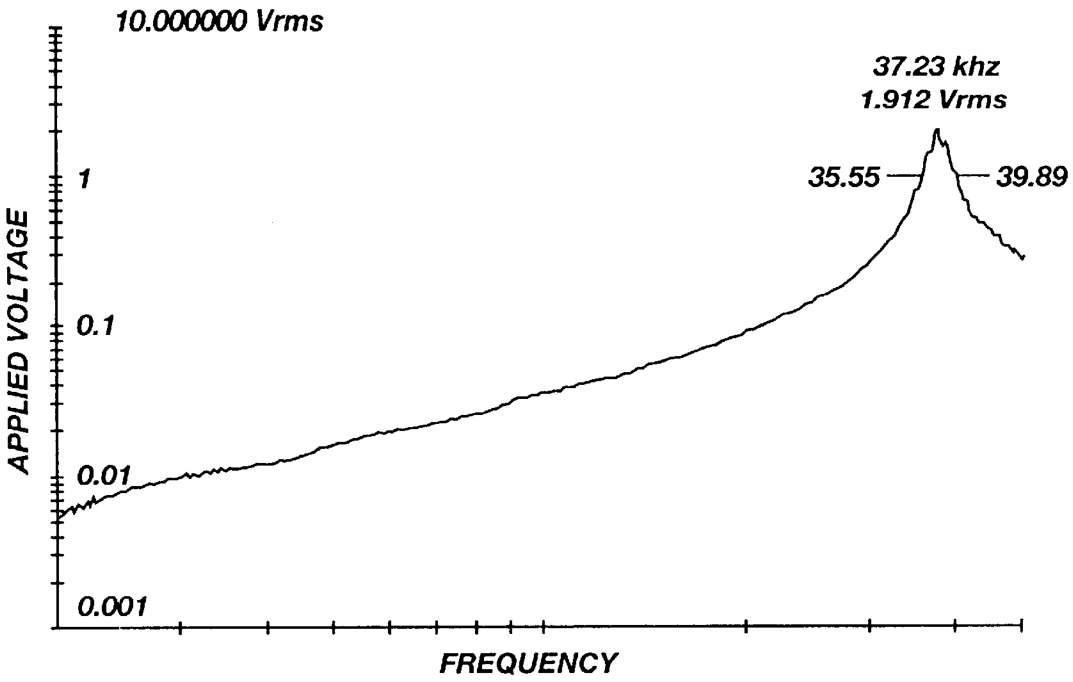
FIG. 5 is a graph showing an example of membrane (piezoelectric film) displacement versus frequency in the preferred embodiment. The graph shows resonant frequency and typical bandwidth generated therefrom.

FIG. 5 is a graph showing frequency response of the emitter drum transducer 100 produced in accordance with the principles of the preferred embodiment as compared to displacement of the piezoelectric film 104 (as a function of applied voltage RMS). The emitter drum transducer 100 which provided the graph of FIG. 5 is exemplary of typical results had with a near vacuum in the interior of the emitter drum transducer 100.

The membrane (piezoelectric film 104) used in this embodiment is a polyvinylidiene di-fluoride (PVDF) film of approximately 28 micrometers in thickness. Experimentally, the resonant frequency of this particular emitter drum transducer 100 is shown to be approximately 37.23 kHz when using a drive voltage of 73.6 $V_{pp}$, with a bandwidth of approximately 11.66 percent, where the upper and lower 6 dB frequencies are 35.55 kHz and 39.89 kHz respectively. The maximum amplitude of displacement of the piezoelectric film 104 was also found to be approximately just in excess of 1 micrometer peak to peak. This displacement corresponds to a sound pressure level (SPL hereinafter) of 125.4 dB.

What is surprising is that this large SPL was generated from an emitter drum transducer 100 using a PVDF which is theoretically supposed to withstand a drive voltage of 1680 $V_{pp}$, or 22.8 times more than what was applied. Consequently, the theoretical limit of these particular materials used in the emitter drum transducer 100 result in a surprisingly large SPL of 152.6.

It is important to remember that the resonant frequency of the preferred embodiment shown herein is a function of various characteristics of the emitter drum transducer 100. These characteristics include, among other things, the thickness of the piezoelectric film 104 stretched across the emitter face 102, and the diameter of the apertures 112 in the emitter disk 108. For example, using a thinner piezoelectric film 104 will result in more rapid vibrations of the piezoelectric film 104 for a given applied voltage. Consequently, the resonant frequency of the emitter drum transducer 100 will be higher.

The advantage of a higher resonant frequency is that if the percentage of bandwidth remains at approximately 10 percent or increases as shown by experimental results, the desired range of frequencies can be easily generated. In other words, the range of human hearing is approximately 20 to 20,000 Hz. Therefore, if the bandwidth is wide enough to encompass at least 20,000 Hz, the entire range of human hearing can easily be generated as a new sonic wave as a result of acoustical heterodyning. Consequently, a signal with sonic intelligence modulated thereon, and which interferes with an appropriate carrier wave, will result in a new sonic signal which can generate audible sounds across the entire audible spectrum of human hearing.

In addition to using a thinner piezoelectric film 104 to increase the resonant frequency, there are other ways for extending frequency range. For example, in an alternative embodiment, the present invention uses a cell 124 having a smaller diameter aperture 112. A smaller aperture will also result in a higher resonant frequency for an applied driving voltage.

While some of the results have been explained, it is also useful to examine some of the equations which may be representative of the dynamics of the present invention. For a theoretical analysis of the film tensions and resonant frequencies please refer to the published works *Vibrating Systems and their Equivalent Circuits* by Zdenek Skvor, 1991 Elsevier, *Marks Standard Handbook for Mechanical Engineers*, Ninth Edition by Eugene A. Avallone and Theodore Baumeister III, and *Theory of Plates and Shells* by Stephen Timoshenko, 2nd edition. Marks' gives a very useful equation (5.4.34) which correlates tension in a membrane to resonant frequency. Resonant frequencies are a function of aperture shape, aperture dimension, back pressure, film compliance and film density. Relationships between these values are complex and beyond the scope of this document.

Figure 6:
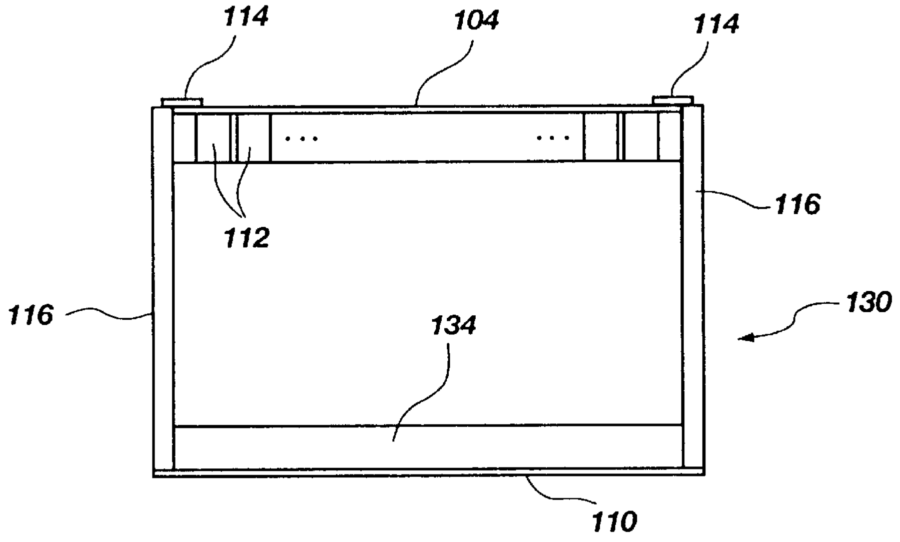
FIG. 6 is a cut-away profile view of the emitter drum transducer of an alternative embodiment where the emitter drum transducer is pressurized.

FIG. 6 shows an alternative embodiment which is at present less advantageous than the preferred embodiment of the present invention, but which also generates frequencies from an emitter drum transducer 116 which is constructed almost identically to the preferred embodiment. The essential difference is that instead of creating a vacuum within the interior of the emitter drum transducer 116, the interior is now pressurized.

The pressure introduced within the emitter drum transducer 116 can be varied to alter the resonant frequency. However, the thickness of the piezoelectric film 104 remains a key factor in determining how much pressure can be applied. This can be attributed in part to those piezoelectric films made from some copolymers having considerable an anisotropy, instead of biaxially stretched PVDF used in the preferred embodiment. The undesirable side affect of an anisotropic piezoelectric film is that it may in fact prevent vibration of the film in all directions, resulting in asymmetries which will cause unwanted distortion of the signal being generated therefrom. Consequently, PVDF is the preferred material for the piezoelectric film not only because it has a considerably higher yield strength than copolymer, but because it is considerably less anisotropic.

One drawback of the alternative embodiment of a pressurized emitter drum transducer 116 is the occurrence of unwanted frequency resonances or spurs. It was determined that these frequency spurs can be attributed to back-wave generation within the emitter drum transducer 116, arising from the presence of air within the emitter drum transducer 116. However, it was also determined that the back-wave could be eliminated by placing a material within the emitter drum transducer 116 to absorb the back-waves. For example, a piece of foam rubber 134 or other acoustically absorbent or dampening material which is inserted into the emitter drum transducer 116 can generally eliminate all frequency spurs.

Experimental results using the pressurized emitter drum transducer 116 showed that at typical selected pressures and drive voltages, the emitter drum transducer 116 operated in a substantially linear region. For example, it was determined that an emitter drum transducer 116 using a 28 micrometer thick PVDF with a pressure of 10 pounds per square inch (psi) inside the emitter drum transducer 116 can generate a resonant frequency approximately 43 percent greater than an emitter drum transducer 116 which has an internal pressure of 5 psi. Alternatively, it was confirmed that a generally linear region of operation was discovered when it was determined that doubling the drive amplitude also generally doubles the displacement of the PVDF.

It was also experimentally determined that the pressurized emitter drum transducer 116 could generally obtain bandwidths of approximately 20 percent. Therefore, constructing an emitter drum transducer 116 having a resonant frequency of only 100 KHz results in a bandwidth of approximately 20 KHz, more than adequate to generate the entire range of human hearing. By acoustically damping the interior of the emitter drum transducer 116 to prevent introducing back-wave distortions or low frequency resonances, the pressurized embodiment is also able to achieve the impressive results of commercially viably volume levels of the preferred embodiment of the present invention.

A further favorable aspect of the present invention is the adaptability of the shape of the sonic emitter to specific applications. For example, any shape of drum can be configured, provided the thin piezoelectric film can be maintained in uniform tension across the disk face. This design feature permits speaker configurations to be fabricated in designer shapes that provide a unique decor to a room or other setting. Because of the nominal space requirements, a speaker of less than an inch in thickness can fabricated, using perimeter shapes that fit in corners, between columns, as part of wall-units having supporting high fidelity equipment, etc. Uniformity of tension of the emitter film across irregular shapes can be accomplished by stretching the film in a plane in an isotropic manner, and then gluing the film at the perimeter of the disk face. Excess film material can then be cut free or folded, and then enclosed with a peripheral band to bind the front and back walls, and intermediate drum wall into an integral package. Such speakers have little weight and merely required wire contacts coupled at the piezoelectric material for receiving the signal, and a pressure line for applying vacuum or positive pressure to distend the film into curvature.

Figure 7:
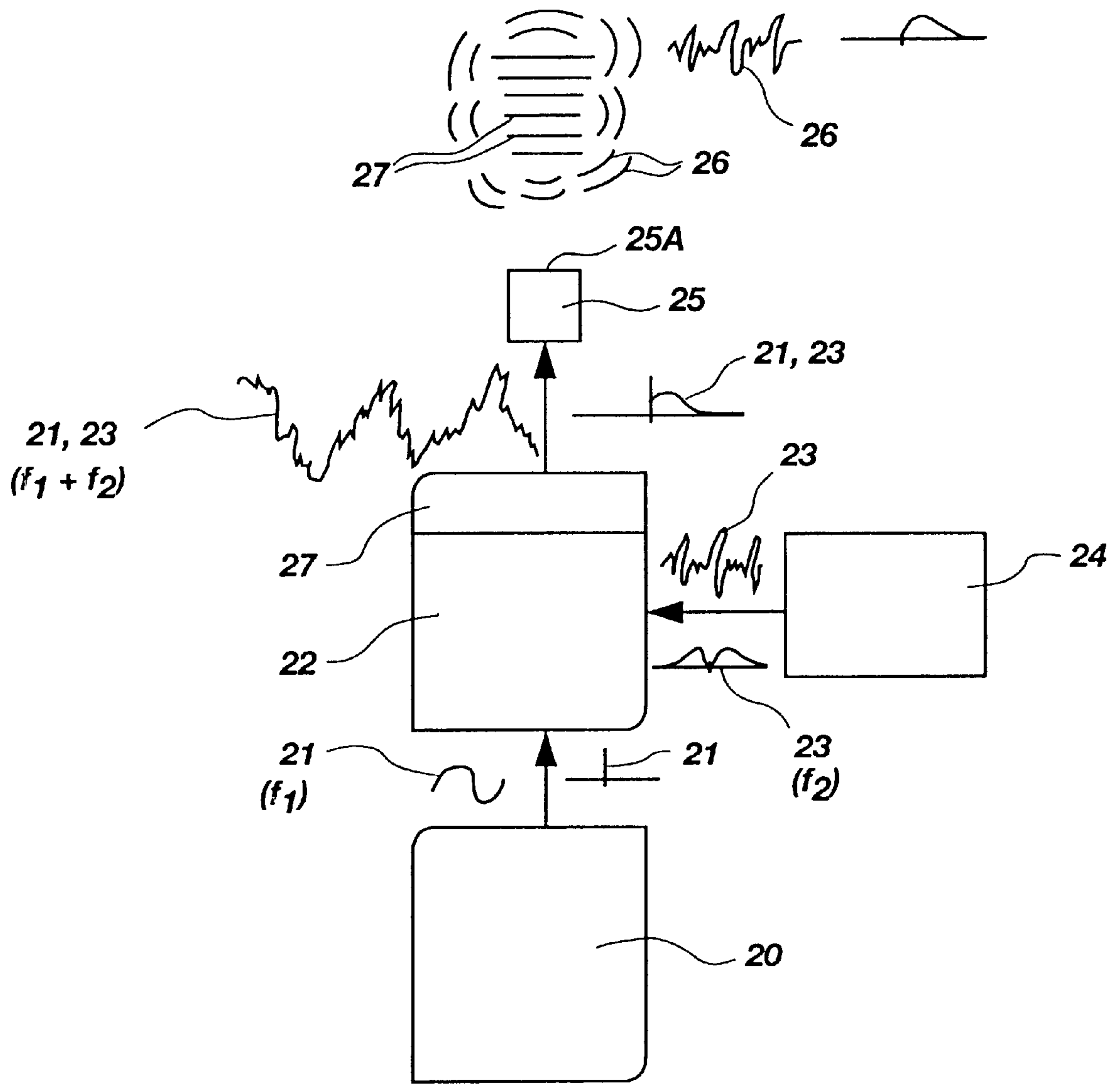
FIG. 7 is a more specific implementation of the present invention which transmits an ultrasonic base frequency and an ultrasonic intelligence carrying frequency which acoustically heterodyne to generate a new sonic or subsonic frequency.

Turning to a more specific implementation of the preferred embodiment of the present invention, the emitter drum transducer 100 can be included in the system shown in FIG. 7. This application utilizes a parametric or heterodyning technology, which is particularly adapted for the present thin film structure. The thin, piezoelectric film is well suited for operation at high ultrasonic frequencies in accordance with parametric speaker theory.

A basic system includes an oscillator or digital ultrasonic wave source 20 for providing a base or carrier wave 21. This wave 21 is generally referred to as a first ultrasonic wave or primary wave. An amplitude modulating component 22 is coupled to the output of the ultrasonic generator 20 and receives the base frequency 21 for mixing with a sonic or subsonic input signal 23. The sonic or subsonic signal may be supplied in either analog or digital form, and could be music from any convention signal source 24 or other form of sound. If the input signal 23 includes upper and lower sidebands, a filter component may included in the modulator to yield a single sideband output on the modulated carrier frequency for selected bandwidths.

The emitter drum transducer is shown as item 25, which is caused to emit the ultrasonic frequencies $f_1$ and $f_2$ as a new wave form propagated at the face of the thin film transducer 25*a*. This new wave form interacts within the nonlinear medium of air to generate the difference frequency 26, as a new sonic or subsonic wave. The ability to have large quantities of emitter elements formed in an emitter disk is particularly well suited for generation of a uniform wave front which can propagate quality audio output and meaningful volumes.

The present invention is able to function as described because the compression waves corresponding to $f_1$ and $f_2$ interfere in air according to the principles of acoustical heterodyning. Acoustical heterodyning is somewhat of a mechanical counterpart to the electrical heterodyning effect which takes place in a non-linear circuit. For example, amplitude modulation in an electrical circuit is a heterodyning process. The heterodyne process itself is simply the creation of two new waves. The new waves are the sum and the difference of two fundamental waves.

In acoustical heterodyning, the new waves equaling the sum and difference of the fundamental waves are observed to occur when at least two ultrasonic compression waves interact or interfere in air. The preferred transmission medium of the present invention is air because it is a highly compressible medium that responds non-linearly under different conditions. This non-linearity of air enables the heterodyning process to take place, decoupling the difference signal from the ultrasonic output. However, it should be remembered that any compressible fluid can function as the transmission medium if desired.

Whereas successful generation of a parametric difference wave in the prior art appears to have had only nominal volume, the present configuration generates full sound. While a single transducer carrying the AM modulated base frequency was able to project sound at considerable distances and impressive volume levels, the combination of a plurality of co-linear signals significantly increased the volume. When directed at a wall or other reflective surface, the volume was so substantial and directional that it reflected as if the wall were the very source of the sound generation.

An important feature of the present invention is that the base frequency and single or double sidebands are propagated from the same transducer face. Therefore the component waves are perfectly collimated. Furthermore, phase alignment is at maximum, providing the highest level of interference possible between two different ultrasonic frequencies. With maximum interference insured between these waves, one achieves the greatest energy transfer to the air molecules, which effectively become the "speaker" radiating element in a parametric speaker. Accordingly, the inventors believe the enhancement of these factors within a thin film, ultrasonic emitter array as provided in the present invention has developed a surprising increase in volume to the audio output signal.

The development of full volume capacity in a parametric speaker provides significant advantages over conventional speaker systems. Most important is the fact that sound is reproduced from a relatively massless radiating element. Specifically, there is no radiating element operating within the audio range, because the piezoelectric film is vibrating at ultrasonic frequencies. This feature of sound generation by acoustical heterodyning can substantially eliminate distortion effects, most of which are caused by the radiating element of a conventional speaker. For example, adverse harmonics and standing waves on the loudspeaker cone, cone overshoot and cone undershoot are substantially eliminated because the low mass, thin film is traversing distances in micrometers.

In general, it should be noted that this aspect of the present invention means that technology is now approaching the final step of achieving truly pure sound reproduction. Distortion free sound implies that the present invention maintains phase coherency relative to the originally recorded sound. Conventional speaker systems do not have this capacity because the frequency spectrum is broken apart by a cross-over network for propagation by the most suitable speaker element (woofer, midrange or tweeter). By eliminating the radiating element, the present invention obsoletes the conventional cross-over network frequency and phase controls.

Figure 8:
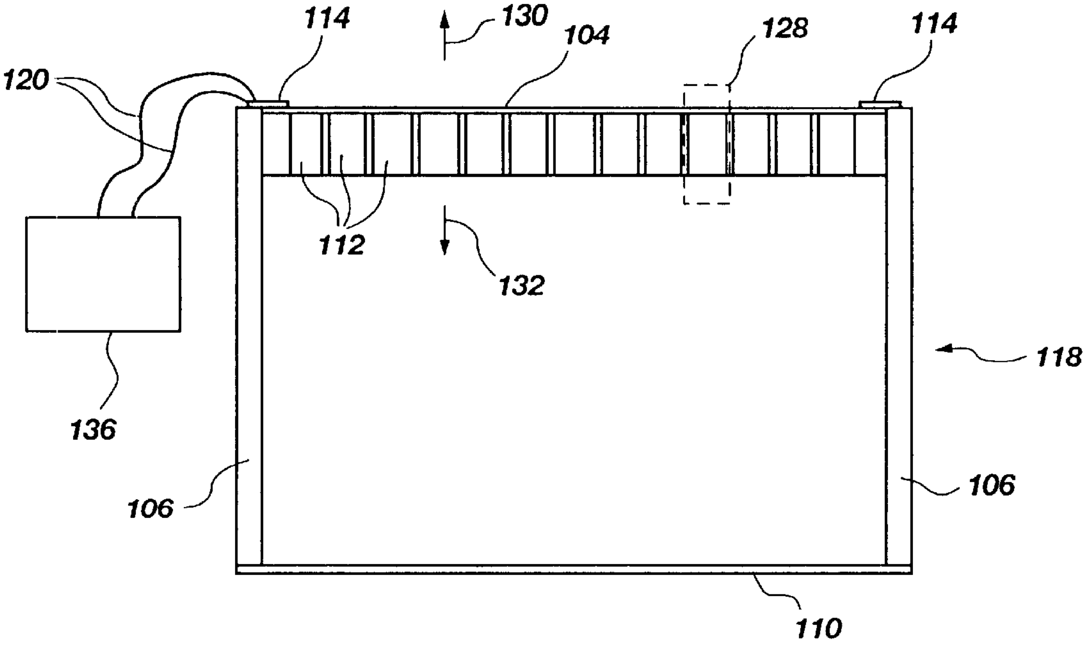
FIG. 8 is an alternative embodiment showing a cut-away profile view of a sensor drum transducer and the sensor face, showing the sensing membrane which is disposed over the apertures in the sensor face.

Another alternative embodiment of the present invention is shown in FIG. 8. It should be apparent that after understanding how the present invention operates as an emitter in the preceded embodiment, it can likewise be used as a receiver or sensor. This is a consequence of the piezoelectric film not only being able to convert electrical energy into mechanical energy, but to do the opposite and convert mechanical energy into electrical energy as well. Therefore, the apparatus of the preferred embodiment is only modified in that instead of a signal source 122 being coupled to the emitter drum transducer 100, the sensing drum is connected to a sensing instrument such as an oscilloscope. Then, transducer 118 converts compression waves which impinge upon the piezoelectric film 104 of the sensing drum transducer 118 into electrical signals essentially working as film 104 to an efficient microphone.

It should also be apparent from the description above that the preferred and alternative embodiments can emit sonic frequencies directly, without having to resort to the acoustical heterodyning process described earlier. However, the range of frequencies in the audible spectrum is necessarily limited to generally higher frequencies, as the invention is unable to generate low or subsonic frequencies. Therefore, the greatest advantages of the present invention are realized when the invention is used to generate the entire range of audible frequencies indirectly using acoustical heterodyning as explained It is to be understood that the above-described embodiments are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A system for indirectly generating at least one new sonic or subsonic frequency from at least two ultrasonic frequencies of different value, said system comprising:

an emitter plate having an outer face and an inner face, said plate including a plurality of apertures;

a piezoelectric membrane including an array of arcuate emitter faces disposed on the emitter plate, said array of arcuate emitter faces being positioned over the plurality of apertures; and electrical input means coupled to the membrane for developing a vibration response at the plurality of apertures and associated arcuate emitter configurations, wherein the vibrations operate as an ultrasonic frequency emitter for concurrently propagating (i) a first ultrasonic frequency and (ii) a second ultrasonic frequency which interacts with the first ultrasonic frequency within a compressible transmission medium to propagate a difference frequency within a sonic bandwidth.

2. The system as defined in claim 1, wherein electrical input means includes a modulating means coupled to the membrane to thereby supply the electrical signals for generating the first and the second ultrasonic frequencies as modulated output of an input ultrasonic frequency and a sonic frequency, said first and second ultrasonic frequencies having a difference in value equal to the at least one new sonic or subsonic frequency.

3. A parametric speaker including a support plate and a thin piezoelectric film having an ultrasonic emitter array for emission of ultrasonic compression waves into a non-linear air medium, wherein the ultrasonic emitter array comprises an array of arcuate emitter cells disposed across the piezoelectric film, electrical input means coupled to the film for developing a vibration response at the arcuate emitter cells, wherein the vibrations operate as an ultrasonic frequency emitter for concurrently propagating (i) a first ultrasonic frequency and (ii) a second ultrasonic frequency which interacts with the first ultrasonic frequency within a compressible transmission medium to propagate a difference frequency within a sonic bandwidth.

4. A parametric speaker as defined in claim 3, wherein the piezoelectric film comprises polyvinylidiene di-flouride.

* * * * *